United States Patent [19]

Golba, Jr. et al.

[11] 4,448,909

[45] May 15, 1984

[54] METHOD FOR DETERMINING COMPOUNDING PROCESS VARIABLES

[75] Inventors: Joseph C. Golba, Jr.; Prakash K. Shete, both of Saratoga, N.Y.

[73] Assignee: General Electric Company, Schenectady, N.Y.

[21] Appl. No.: 374,588

[22] Filed: May 3, 1982

[51] Int. Cl.³ .................... C08L 25/02; C08L 25/04; C08L 25/06; C08L 25/08

[52] U.S. Cl. ................................ 523/303; 436/85; 524/114; 524/140; 524/141; 524/143; 524/537; 524/575; 524/577; 524/578; 524/579; 524/582; 524/585; 524/600; 524/611; 524/707; 524/710; 524/752; 526/59; 526/60; 526/61; 526/88; 528/125; 528/126; 528/128; 528/172; 528/179; 528/180; 528/181; 528/182; 528/185

[58] Field of Search ............... 436/85; 526/59-61, 526/88; 523/303; 524/114, 140, 141, 143, 405, 413, 600, 611, 701, 710, 752, 537, 575, 577-579, 582, 585; 528/125, 126, 128, 172, 179-182, 185

[56] References Cited

U.S. PATENT DOCUMENTS

3,846,073 11/1974 Baum et al. ..................... 436/85

Primary Examiner—Lester L. Lee
Attorney, Agent, or Firm—Richard J. Traverso; James C. Davis, Jr.; James Magee, Jr.

[57] ABSTRACT

A method for determining the concentration of additives in a compounding process by measuring the capacitance and dissipation factor (tan$\delta$) of the mixture and converting such values to the concentrations of the additives. This method may also be utilized to determine the concentration of the polymers in the mixture. This method is preferably applied to a compounding process of blending polyphenylene oxide and polystyrene thermoplastic resins and is preferably applied to a continuous compounding process of these resins to determine therein the concentration of an aryl phosphate ester flame retardant.

16 Claims, 4 Drawing Figures

METHOD FOR DETERMINING COMPOUNDING PROCESS VARIABLES

Cross-reference is hereby made to Ser. No. 374,585 which is filed concurrently herewith and assigned to the same assignee as the present invention.

BACKGROUND OF THE INVENTION

The present invention relates to a method for electronically determining process variables in a compounding process and more particularly the present invention relates to a method of determining the concentration of ingredients in a compounding process by measuring the capacitance and the dissipation factor of the compounded mixture.

As noted, in the publication of Hedwig, entitled "Dielectric Spectroscopy of Polymers," published by John Wiley & Sons, 1977, and especially Chapter 6 and 7 of that book, there is disclosed that various types of organic polymers have determinable measurable dielectric constants and dissipation factors which dielectric constants and dissipation factors vary with the degree of polymerization of the polymer. Also, there is the publication of Sanjana, entitled, "The Use of Dielectric Analysis in Characterizing the Degree of B-Staging and Cure of Composites,"—International Conference on Polymer Processing, August 1977, MIT Press (1978), which is concerned with the determination of the B stage of a thermosetting polymer by measuring the dielectric dissipation factor of the mixture. However, nothing was mentioned in these publications about determining the processing variables of thermoplastic polymers or the ingredients input of thermoplastic or thermosetting polymers and determinations of the degree of polymerization of the final desired polymer. In the copending case, Golba et al., Ser. No. 374,585, which was filed on the same date as the present case and entitled "Method for Measuring Polymerization Process Variables," there is disclosed a method for determining the concentration of ingredients in a continuous polymerization process or in a batch polymerization process by determining the dielectric constant and dissipation factor of the monomer mixture with various additives in it, as it passes from one processing step to another. Thus, first the capacitance of the mixture is measured in e.g. a capacitance cell then translated to a dielectric constant which by computer means or otherwise can be utilized to determine the concentration of ingredients from a calibration curve. In an analogous way, the catalyst and a stabilizer additive can be determined by measuring dissipation factor and capacitance and utilized to control the process. Further, the capacitance of the mixture can be measured in various stages of polymerization and translated to a dielectric constant and the dissipation factor can be measured which, by use of computer means or otherwise, can be utilized to determine the degree of polymerization of the mixture and used to control the process variables. Further, as disclosed in that application, the capacitance and the tan $\delta$ or dissipation factor of the monomer mixture can also be measured to determine the ionic impurities in the monomers.

Accordingly, this method can be utilized to measure and control the variables such as ingredients and polymerization conditions in a batch or continuous polymerization process. This method is much preferred for continuous polymerization process since the method is electronic and can determine concentrations by use of an automatic capacitance bridge and a computer in a matter of fractions of a second. This information can then be utilized accordingly for control of the process variables. Although the method of Ser. No. 374,585 could be utilized to control the process variables for any batch or continuous polymerization process, in the preferred embodiment, it is utilized in the polymerization of polycarbonates and polyetherimides. There are other processes where it is desirable to measure and control the processing variables other than a polymerization process.

Accordingly, in the formation of thermoplastics, one important area is a compounding process. That is, for various reasons, two or more polymers are compounded into an intimate thermoplastic mixture into which various types of additives may be added. An intimate uniform mixture is desired in that it has properties which either one or both or more of the ingredients do not individually have. Accordingly, it would be highly desirable to be able to measure and continuously control the process variables in such compounding process. Once such compounding process is in the fabrication and preparation of rubber-modified styrene resin-polyphenylene ether resin compositions wherein the rubber component is of the unsaturated type such as polymers and copolymers of butadiene hereinafter also referred to as "PPO-polystyrene blend". In the past, these resins were prepared by mixing polystyrene resin with polyphenylene oxide resin and various additives, including a flame retardant such as a liquid triarylphosphate ester compound an example of which is produced by the FMC Corporation under the trade name Kronitex-50 ®. The mixture was mixed in a screw extruder and a sample of the uniform mixture was taken out of the extruder and analyzed for the various ingredients. If they were in proper proportions as required to generate specified property profiles, then the process would be continued to produce the desired product. It should be noted that this type of compounding process was utilized since the resin blend was a custom blend for a particular customer and various customers required different types of custom blends. In addition, in a custom blend, it was necessary to determine the ingredients coming out of the extruder to determine that indeed, the desired end composition of compounded product was obtained from the extruder before the material could be further produced to meet a customer's needs.

Up to this time, the standard procedure for the analysis of such blends was to take a sample of a compounded blend and submit to x-ray fluorescent spectroscopy or other analytical means, determine the concentration of ingredients in the laboratory and then utilize the results to monitor the inputs of ingredients into the compounding process. Such analyses are time consuming and resulted in undesirable downtime in the compounding process. Accordingly, it was highly desirable to have an on-line/real time means for determining the ingredients in a compounding process such that the process could be operated in a batch or in a substantially continuous manner.

In accordance with the above objects.

FIG. 3 is a plot of the dielectric constant versus percent Kronitex-50 ® for particular blends of polyphenylene oxide and polystyrene resin.

Both FIGS. 3 and 4 show the amount of error in determining concentration of Kronitex-50 ® utilizing the present method in determining Kronitex-50 ® in such blends.

Accordingly, it is one object of the present invention to provide for a process of determining the concentration of a flame retardant in a compounding process for producing thermoplastic resins.

It is an additional object of the present invention to determine the amount of ingredients in a blend of resins produced by a compounding process utilizing an extruder by measuring the dielectric constant of the extruded mixture.

It is yet an additional object of the present invention to determine the concentration of ingredients in a compounding process for producing a blend of thermoplastic resins with additives by measuring the dissipation factor (tan δ) of the blend.

It is still an additional object of the present invention to provide a method for determining the ionic impurities in a compounding process for producing a blend of resins by measuring the dielectric constant and the tan δ of the blended mixture.

It is a further object of the present invention to provide for a method for determining the amount of flame retardant blended into a uniform blended mixture of polyphenylene oxide and polystyrene.

It is a still further object of the present invention to provide a method for determining the concentration of ingredients in a continuous compounding process by measuring the dielectric constant or the tan δ (dissipation factor) of the mixture after it has been uniformly mixed. These and other objects of the present invention are accomplished by means of the disclosure set hereinbelow.

SUMMARY OF THE INVENTION

In accordance with the above objects, there is provided by the present invention a method for obtaining a predetermined additive concentration in a polymer mixture comprising (1) mixing at least one polymer and at least one additive to form a mixture; (2) determining the dielectric constant of the mixture and (3) controlling the amount of additive to obtain a dielectric constant in the mixture which is substantially the same as the dielectric constant of the desired mixture. Preferably, this method is applied in a continuous compounding process where the polymer and the additives are mixed in an extruder. Preferably also, there is at least one other polymer in the mixture blend and the additive is a flame retardant.

The preferred mixture is a blended mixture of polyphenylene oxide resin, polystyrene resin and a phosphate type flame retardant which can be triaryl phosphate esters. By measuring the dielectric constant and/or dissipation factor of the resins and a flame retardant coming out of the extruder which are blended to a uniform mixture, the concentration of the flame retardant can be determined. The dielectric constant and dissipation factor of the mixture are measured utilizing an automatic capacitance bridge. Further preferably, the automatic capacitance bridge is connected to computer interface equipment which converts the capacitance to the dielectric constant and converts dielectric constant and/or dissipation factor to a concentration of the desired ingredient and utilizes this value to control the amount of ingredient that is introduced into the process downstream. Although this method of determining the concentration may be utilized with a batch process, it is most preferably utilized with a continuous process for obvious reasons. Such concentrations can be determined in a matter of fractions of a second.

Further, although it may not be applied to all types of resins, in the case of a blend of polystyrene and polyphenylene oxide resins and the Kronitex-50 ® flame retardant, the dissipation factor (tan δ) or capacitance (dielectric constant) may be utilized to measure the concentration of ingredients.

DESCRIPTION OF THE PREFERRED EMBODIMENT

The present process can be utilized to determine the concentration of ingredients such as polymers, monomers, and other additives and additives such as flame retardants in a compounding process for producing thermoplastic polymers. The present method can be utilized to measure capacitance and convert that to a dielectric constant of any polymer or monomer and by referring to calibration curve as will be explained below, to determine the concentration of such polymer or monomer in the mixture. In the same way, there can be determined concentration of additives in the mixture that is formed such as, for instance, flame retardants. This process can be utilized to determine the concentration of ingredients by measuring the capacitance and converting that value to a dielectric constant and measuring also the dissipation factor (tan δ) of any polar polymer, monomers and additives. It can also be applied to determining the concentration of substantially non-polar substances. Even such non-polar substances will tend to respond to the electric field in a capacitance cell and will give some reading as to capacitance and tan δ (dissipation factor) which can then be converted to concentration of ingredients. However, it can be appreciated that for substantially non-polar substances, the capacitance value will be substantially less than for the capacitance value or tan δ value of polar substances.

In addition, the greatest advantage of the instant process is for determining the concentration of ingredients in a continuous compounding process since by the use of a computer the computer can control the continuous process and can translate capacitance and/or dissipation factor readings into concentrations in a fraction of a second and utilize such readings to control the compounding process. However, it can be appreciated that the present method can also be utilized to determine concentrations of ingredients in a batch-type of process.

In order to understand the method by which the concentration of ingredients may be measured, it is necessary to discuss here some of the theory in connection with capacitance and the dielectric constant. It is also desirable here to discuss some of the theory with respect to the dielectric constant and the tan δ (dissipation factor).

Alternatively, the dielectric constant which is equal to $\epsilon'$ defines the relative permittivity of the mixture. This is substantially a constant for a pure material or pure mixture of material. That is, it is a constant for a mixture of materials or a particular pure material at a particular temperature and frequency. It varies with frequency and temperature as will be explained below. Another way of stating the dielectric constant is as follows:

$$\epsilon' = \frac{\epsilon'_a}{\epsilon'_o} = \frac{\text{absolute permittivity}}{\text{permittivity of vacuum}}$$

$$\epsilon' = \frac{C_x}{C_o} = \frac{\text{measured capacitance}}{\text{capacitance with vacuum}}$$

Note:
$$C = \frac{\epsilon'_a A}{H} = \epsilon' \frac{(\epsilon'_o A)}{H}$$

where
C is equal to capacitance of the material,
$\epsilon'$ is the dielectric constant of the material,
$\epsilon'_a$ is the absolute dielectric constant or permittivity of the material
$\epsilon'_o$ is the dielectric constant or permittivity of vacuum.

Alternatively, in considering the alternating voltage and current in a capacitor through which a polymer mixture flows, there can be defined the voltage and the current passing through the capacitor as follows:
if applying alternating voltage, V(t), where
$V(t) = V_o \exp i\omega t$
Vo = voltage magnitude in
$\omega$ = angular frequency in
t = time
get current, I(t), across capacitor where $$I(t) = \frac{d[C_x V(t)]}{dt} \text{ is a complex current}$$

where
$I(t) = iI_c(t) + I_L(t)$
and
$I(t) = [i\omega\epsilon' + \omega\epsilon''] C_o V(t)$
thus
$I_c(t) = C_o \epsilon' V(t)$
$I_L(t) = C_o \epsilon'' V(t)$ $I_c(t)$ is the capacitance component of the current or imaginary component of the complex current I(t). $I_L$ is the loss (or resistive) component of the current or real part of the complex current I(t). When $I_L$ is greater than zero a power loss or energy dissipation will occur.

Accordingly, tan $\delta$ the dissipation factor, is defined $$\tan\delta = \frac{I_L}{I_C} = \frac{\omega C_o \epsilon'' V(t)}{\omega C_o \epsilon' V(t)} = \frac{\epsilon''}{\epsilon'}$$

where $\epsilon''$ is the loss factor.

In applying a mathematical analysis of a simple model of a polymer mixture represented as a capacitance $C_x$ in parallel with a resistance $R_x$, the following equations are arrived at:

$$\epsilon' = \frac{C_x}{C_o}$$

$$\epsilon'' = \frac{1}{R_x C_o}$$

-continued $$\tan\delta = \frac{1}{R_x C_x \omega}$$

In general, for such an electric circuit, the resistance or $R_x$ can be expressed in terms of the equation.

$1/R_x = 1/R_i = 1/R_d$ where $R_i$ is resistance due to ionic conduction and $R_d$ is resistance due to non-ionic conduction. Thus, substituting in the tan $\delta$ equation there is obtained the following values for tan $\delta$ for such an electric circuit.

$$\tan\delta = \frac{1}{\omega R_i C_x} + \frac{1}{\omega R_d C_x}$$

By definition, $R_i$ is a constant and not a function of frequency while $R_d$ is a function of frequency. If there is a region where plot of $\log_{10} \tan \delta$ versus $\log_{10}\omega$ yields a plot with a slope of $-1$, then you have only ionic conductivity contribution. For example, $R_d$ will be absent.

Accordingly, in the region of ionic conductivity, $$R_i = \frac{1}{\omega C_x \tan\delta}$$

If you have an area of frequency in which the tan $\delta$ is measured by the capacitance cell is such that the $\log_{10}$ tan $\delta$ plot versus $\log_{10}\omega$ plot yeilds a slope of $-1$ then the concentration of the ionic impurities in the polymer mixture and the ingredients can be determined. This can be done by taking known concentrations of known types of ionic impurities in the different polymers or monomers and determining the tan $\delta$ and capacitance value at various concentrations of ionic impurities and types of impurities. By this means there can be made plot of $R_i$ versus ionic concentration of various types of ionic impurities and such plots or calibration curves can be used in a compounding process so that if the tan $\delta$ and $C_x$ of the impurity in a polymer or monomer mixture can be measured and this converted to $R_i$ value and then manually or through a computer there can be determined the concentration of the impurity and the type of impurity.

It should be noted further the particular $R_i$ can be calculated through the equation $R_i = \rho H/A$ where $\rho$ is resistivity in ohms per centimeter. Further, the ion concentration can be calculated from the equation $$\text{Ion Conc.} = \frac{1}{\rho e \mu}$$

where e is an electronic charge in coulombs or volt seconds per ohm, $\mu$ = ion mobility in centimeters squared per volt per second. Therefore, if you know the ion mobility for particular ion, you can calculate the ionic species concentration. However, the simplest way of utilizing the foregoing mathematical analysis and particularly the $R_i$ equation which is given in terms of $\omega C_x$ and tan $\delta$ is to have a calibration curve and then measure the dielectric constant and tan $\delta$ of the mixture containing the unknown ionic impurity and by reference to the calibration curve determine the concentration and the type of ionic impurity in the mixture. With respect to the capacitance and the dielectric constant, the dielectric constant will vary for a particular mixture. By determining the dielectric constant of the mixture and by referring to a calibration curve of dielectric constant versus concentration for a particular temperature, a concentration of the desired ingredient can be determined.

It should be noted that all mixtures have determinable dielectric constants and the dielectric constant of the different polymer mixtures that were experimented with vary in a determinable manner depending on the concentration of ingredients in a polymer mixture. This determination was made with respect to the addition of a flame retardant to a blend of polyphenylene oxide resin and polystyrene resin in the present case. It was determined that the dielectric constant varied at a determinable manner depending on a concentration of a flame retardant in the mixture. This type of analysis should apply to the other ingredients as well.

The tan δ, dissipation factor, will also vary in a determinable manner with the concentration of certain ingredients, in particular polymer systems. That is, for instance, as the concentration of the ingredient increases in the polymer mixture, the tan δ may increase or decrease in a determinable manner as shown by FIG. 3. FIG. 3 shows the determinable variation of dielectric constant with percent by weight of Kronitex-50 ® in a polymer mixture. In both cases, as the amount of Kronitex-50 ® increases in the polymer mixture, the dielectric constant and the tan δ increases in a determinable manner. Such calibration curves can be made for other ingredients in the compounded mixture.

Figure 4:
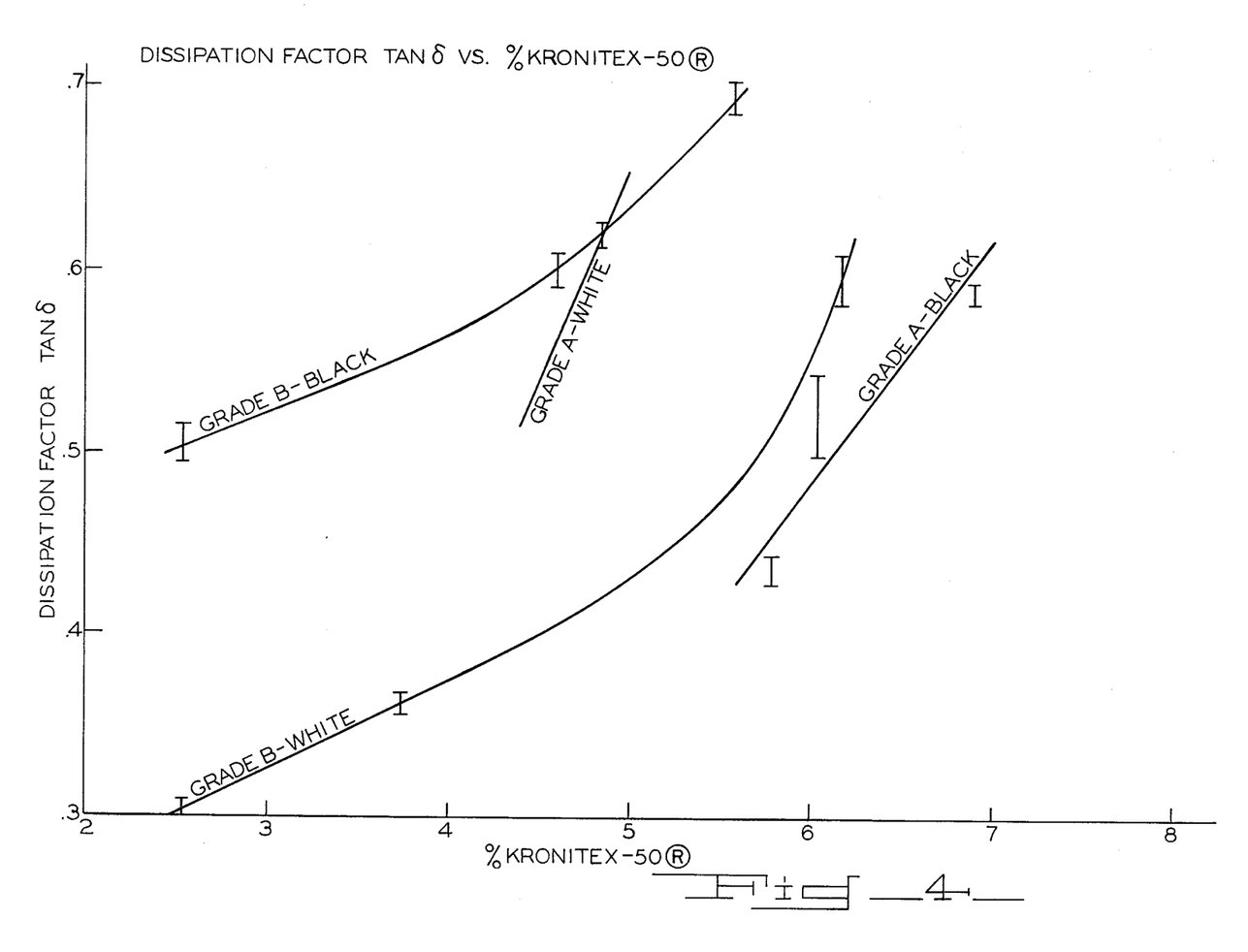
FIG. 4 is a plot of tan δ or dissipation factor versus percent Kronitex-50 ® for particular blends of polyphenylene oxide and polystyrene.

FIGS. 3 and 4 were of the Kronitex-50 ® addition to polyphenylene oxide resin and polystyrene resin. However, in such systems, it is envisioned that other ingredients should also vary in the same determinable manner as above. However, the particular curves of other materials may behave in a somewhat different manner as far as the dissipation factor is concerned. Thus, the polycarbonate system disclosed in Ser. No. 374,585 of Golba et al. varies in a somewhat different manner with respect to tan δ.

Accordingly, such polycarbonate system increases to a maximum and peaks with increased concentration of ingredients and then decreases. Accordingly, although the tan δ may be used in such a system to determine concentration where only one part of the curve is utilized, it cannot be utilized to determine all concentrations of a particular ingredient using the tan δ calibration curve. As far as is known, the dielectric constant will vary in a determinable manner and increases or decreases with the varying concentration of various ingredients both for the polycarbonate system and for the polyphenylene oxide polystyrene system of the preferred embodiment of the present case.

However, the tan δ will vary in a different manner depending upon the particular type of system that is involved. For a high viscosity system, such as encountered in the preferred embodiment of the present case, the calibration curve of tan δ can be utilized to determine concentration of ingredients.

The present invention was reduced to practice in the preparation of a blend of a flame retardant Kronitex-50 ® in a PPO-polystyrene blend. The disclosure of U.S. Pat. No. 3,383,435 is incorporated herein by reference.

The polyphenylene ethers with which this invention is concerned are those having the repeating structural unit of the formula wherein the oxygen ether atom of one unit is connected to the benzene nucleus of the next adjoining unit, n is a positive integer and is at least 100, and each Q is a monovalent substituent selected from the group consisting of hydrogen, halogen, hydrocarbon radicals free of a tertiary α-carbon atom, halohydrocarbon radicals having at least two carbon atoms between the halogen atom and phenyl nucleus and being free of a tertiary α-carbon atom, and halohydrocarbonoxy radicals having at least 2 carbon atoms between the halogen atom and phenyl nucleus and being free of a tertiary α-carbon atom.

The preferred polyphenylene ethers are those having alkyl substitution ortho to the oxygen ether atom and most preferably, ortho methyl substitution. These polymers are preferred because they combine with polystyrene to form fully compatible, homogeneous, mixtures.

The styrene resin is one having at least 25 percent, by weight, polymer units derived from the compound having the formula:

where R is hydrogen, lower alkyl or halogen; Z is a member selected from the class consisting of vinyl, hydrogen, chlorine and lower alkyl; and p is a whole number equal to from 0 to 5. The term "styrene resin" as used throughout this disclosure and in the claims, and defined by the above Formula II includes, by way of example, homopolymers such as polystyrene and polychlorostyrene, the modified polystyrenes such as rubber modified polystyrenes, and the styrene containing copolymers such as the styreneacrylonitrile copolymers (SAN), styrenebutadiene copolymers, styrene-acrylonitrile-α-alkyl styrene copolymers, styrene-acrylonitrile-butadiene copolymers (ABS), poly-α-methylstyrene, copolymers of ethylvinylbenzene and divinylbenzene, and the like. The preferred styrene resin are the high impact polystyrenes, the ABS copolymers and the SAN copolymers.

The method of blending the polyphenylene ether with the styrene resin is not critical and does not constitute a part of this invention. The preferred method comprises feeding the two polymers in powder or granular form, extruding the blend, and chopping into pellets.

As noted above, the polyphenylene ethers and the styrene resins are combinable with each other in all proportions. Consequently, compositions comprising from 1 to 99 percent, by weight, polyphenylene ether and from 99 to 1 percent, by weight, styrene resin are included within the scope of the invention. In general, compositions containing from 40 to 85 percent polyphenylene ether and from 60 to 15 percent styrene resin exhibit the best overall combination of properties and these compositions are preferred.

The benefits obtained by blending a styrene resin with a polyphenylene ether are illustrated in the following examples which are set forth as further description of the invention, but are not to be construed as limiting the invention thereto.

Unless otherwise indicated, all blends were prepared having compositions varying from 100 percent polyphenylene ether and 0 percent styrene resin to 100 percent styrene resin and 0 percent polyphenylene ether by passing mixtures of the polymers through a co-rotating, fully intermeshing twin screw extruder with temperature maintained between 450° and 530° F. depending upon the particular polymers used. The strands emerging from the extruder were cooled, and chopped into pellets.

Accordingly, the present process in the preferred embodiment of the present case is applied to determining the concentration of ingredients in a compounding process for the production of a thermoplastic material.

Figure 1:
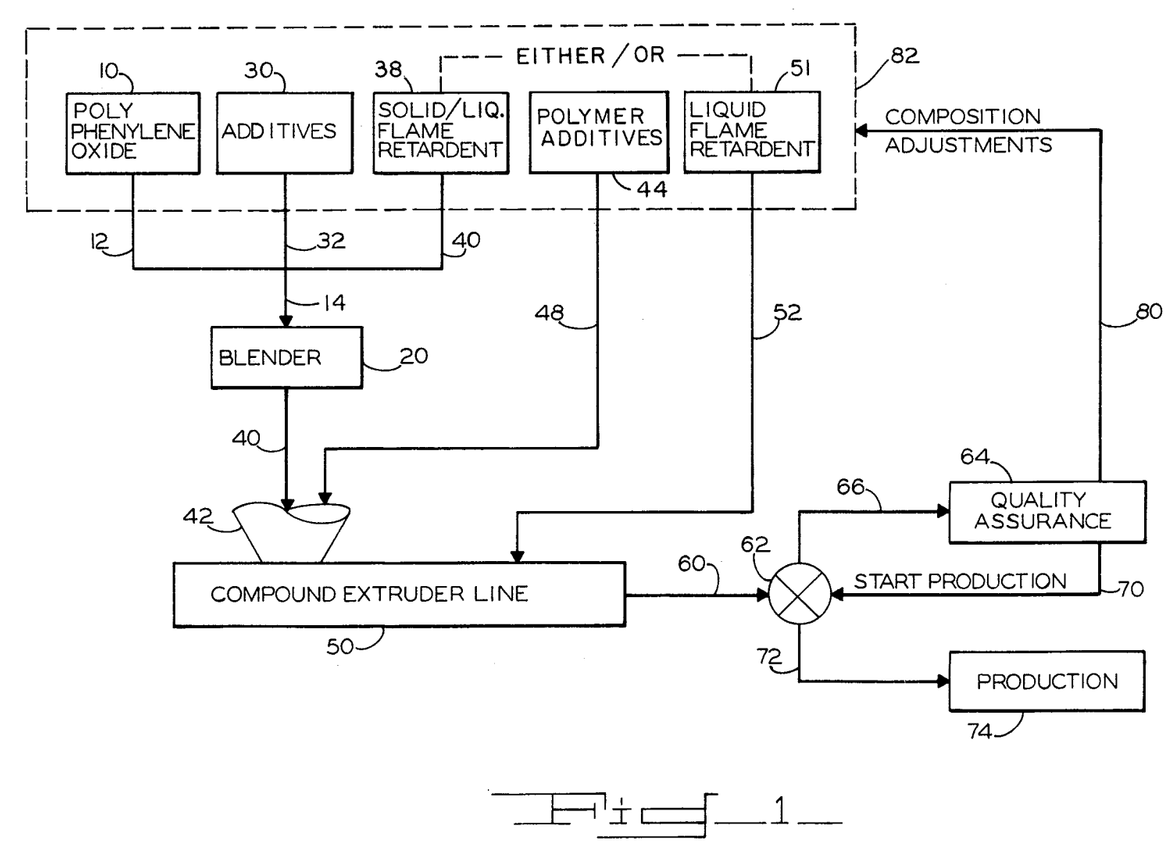
FIG. 1 is a schematic diagram of the compounding process that was operated in the past.

Proceeding to FIG. 1, there is disclosed a schematic diagram of the traditional process for adding additives and flame retardants to PPO polystyrene blends to produce a compounded or blended mixture having the desired properties. Further, it should be noted that the flame retardant is typically triaryl phosphate esters. Polyphenylene oxideresin is passed from container 10 through lines 12 and 14 into blender 20. Into blender 20 there is also passed additives from container 30 through line 32 and line 14. The additives can be, for instance, pigments, stabilizers, fillers, other polymers, etc. which can be utilized for such purposes such as coloring, thermal stabilization and stabilization against certain environmental agents, modification of property profiles, melt flow modifications, etc.

Further, from container 38, through lines 40, and 14 there is added to blender 20 a liquid or solid flame retardant which preferably is Kronitex-50 ® or triphenyl phosphate, respectively.

The Kronitex-50 ® is preferred. All of these ingredients that are added in blender 20, that is the additives, the Kronitex-50 ® and the polyphenylene oxide resin are blended to a uniform solid mass. From blender 20, the mass proceeds through line 40 into hopper 42 via a feeder.

It should be noted that it is desirable that a liquid flame retardant be used. However, the mixture tends to become sticky and difficult to blend in blender 20 if a liquid flame retardant is added at that point because the other additives are solid.

Into hopper 42 there is also added via a feeder rubber modified sytrene resin from container 44 through line 48. The entire mixture passes into compounding screw extruder line 50. Alternatively, liquid flame retardant may be added from container 51 through line 52 downstream in extruder line 50. However, the difficulty with this procedure is that the control of existent metering equipment is not sufficiently accurate and requires constant adjustment of the metering equipment and analysis of the end product so as to control the concentration of the flame retardant. As a consequence it has not been often used in the past. The material comes out of extruder 50 through a die at the end of the extruder, not shown, and passes through line 60 to control center 62.

In the past, control center 62 consisted of an operator who took a sample and sent it to quality assurance 64 as shown by line and arrow 66. The material was within the desired specifications, a message was sent to control center 62 as indicated by line and arrow 70 whereupon production was started and the compounded material passed from control center 62 through line 72 into production and storage 74.

If quality assurance 64 determined that the sample was not within the desired parameters, then it would send instructions as indicated by line and arrow 80 to input center as indicated by dotted lines 82 to change the input of various ingredients as desired.

Then control center 62 would send a message to input parameter 82 to begin a run with that concentration of ingredients and a run would be made whereupon the material would pass from control center 62 through line 72 to production, storage and shipment shown by block 74 in FIG. 1. As can be imagined, the quality assurance process of this method was time consuming. This batch quality control analysis decreases the productivity of the extrusion line since the line was shut down for a substantial amount of time.

This method of compounding is desired for the production of certain thermoplastic polymers such as PPO-polystyrene blends since such polymers are made to customer specifications. Different customers want different properties in their thermoplastic polymers. Accordingly, for different customers there is blended a different polymer blend of ingredients, that is, different amounts of the two polymers and different amounts of the additives and different amounts of the particular flame retardant.

Accordingly, the particular compounding process is necessary, and it was desirable to find a way of shortening the time of determining the concentration of ingredients in the final polymer blend coming out of line 60.

Figure 2:
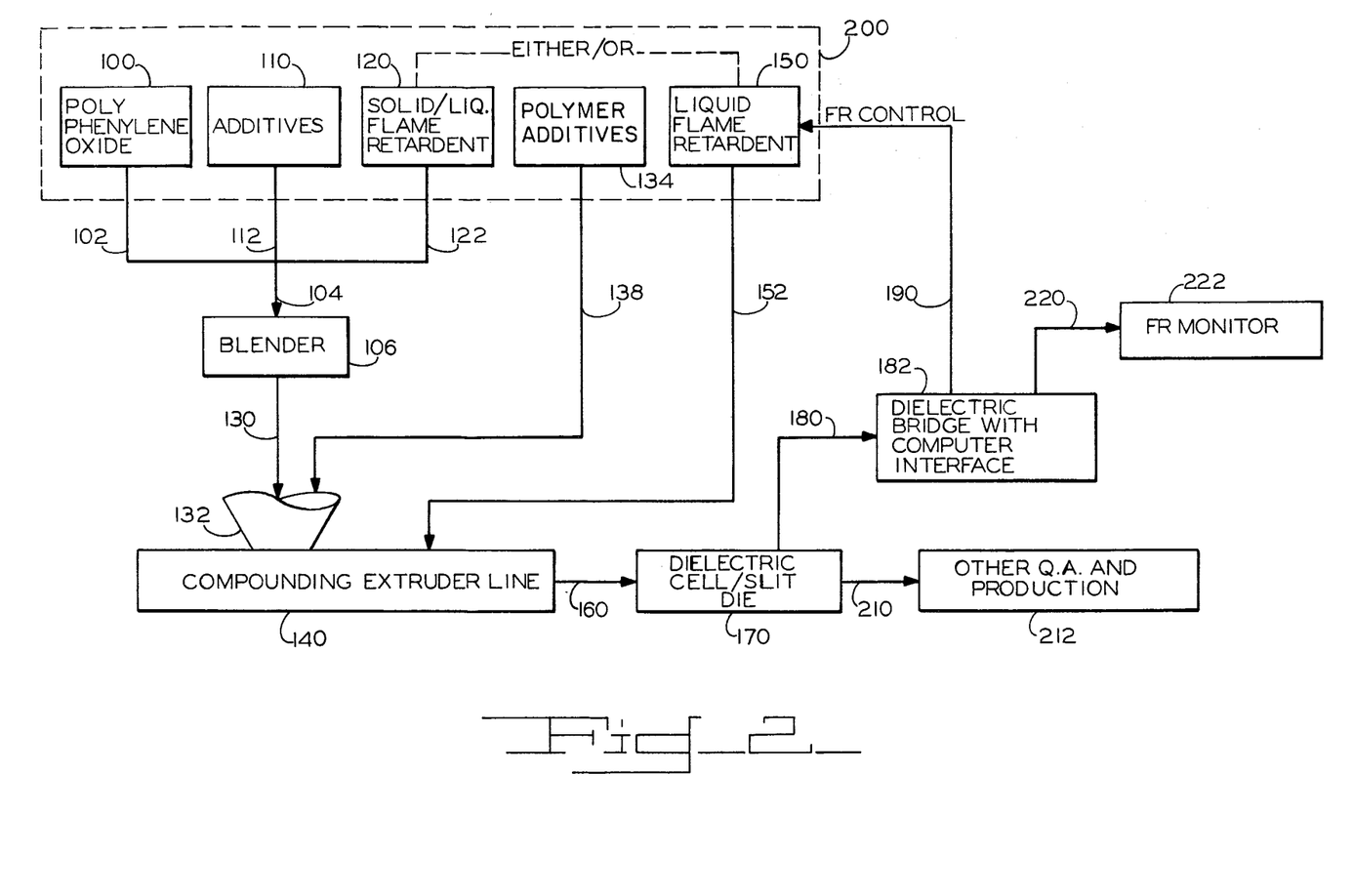
FIG. 2 is a schematic diagram of the preferred compounding process for compounding a blend of polystyrene and polyphenylene oxides continuously in accordance with the preferred method of instant case.

It is desirable to have a more continuous compounding process as that shown in FIG. 2. FIG. 2 is a schematic diagram of the proposed continuous compounding process of PPO-polystyrene blends utilizing the invention of the instant case. Polyphenylene oxide resin is taken from a container 100 and passed through lines 102 and 104 into blender 106. Additives such as the foregoing additives disclosed previously, are passed from container 110 through line 112 and line 104 into blender 106. Solid or liquid flame retardant such as triphenyl phosphate, is passed from container 120 through line 122 and line 104 into blender 106. The ingredients are uniformly blended in blender 106 and passed by line 130 into hopper 132 via feeders. Rubber modified sytrene resin is then added from container 134 through line 138 via feeder to hopper 132. The entire blend of mixtures is then passed from hopper 132 into compounded extruder line 140 which is a screw extruder which melts and uniformly mixes and blends the ingredients into a uniform blend.

Towards the latter part of the component extruder line 140 there alternatively and desirably may be added liquid flame retardant Kronitex ®-50 or other liquid flame retardants in container 150 through line 152 into the latter part of extruder line 140 as shown in FIG. 2. That is, either the solid flame retardant may be utilized in this process or liquid flame retardant, preferably the Kronitex ®-50, depending upon the properties that are desired to be obtained in the uniform blended mixture that is obtained from extruder 140 out of line 160. The blended material passes out of an extruder line 160 into dielectric cell 170 where a signal is sent at one or various frequencies through line 180 into automatic capacitance bridge with computer interface 182. It is important to utilize an automatic capacitance bridge with this invention since it determines capacitance in a matter of a fraction of a second and also measures tan δ. Then the computer interface 182 can be utilized to convert the capacitance to dielectric constant and to convert the dielectric constant and the tan δ to the concentration of the desired ingredient by reference to prior calibration curves as noted previously.

If the concentrations are within the desired level, the computer will do nothing but send a signal to input control 200 shown by dotted lines to begin a production run and then the production run is begun. If the concentration of ingredients is not within the desired parameter then computer interface 182 will send a signal to input control 200 to change the desired ingredients particularly the liquid flame retardant or the solid flame retardant so as to change the desired concentration of ingredients that is obtained from line 160 coming from compounding extruder line 140. This can be done in a matter of seconds.

Accordingly, when the compounding output of PPO-polystyrene blend through line 160 is within the desired parameters, then a standard run will be begun and material will pass from dielectric cell 170 through line 210 into a production run or other quality assurance determination procedure as set forth by block 212 in FIG. 2. Other quality assurance determinations may be necessary before the run is begun or they may be determined as desired depending on the current practice.

Further, the automatic dielectric bridge 182 may make a determination and that determination may be read manually as indicated by line 220 and block 222. That individual may then go to a calibration curve as noted previously and make the concentration determination of the ingredient and then send the desired message to the input control 200 with respect to the flame retardant going into the compounding process or extruder line 140. However, with the use of a computer interface, this can be done at a much faster rate and result in substantial labor cost savings.

As shown in FIG. 2, this process in the method of the instant invention is utilized with a proposed continuous compounding process for PPO-polystyrene blends utilizing the instant invention to determine the concentration of a triarylphosphate ester flame retardant. The invention was reduced to practice only with respect to Kronitex-50 ® in PPO-polystyrene blends. However, there is no reason why the instant process cannot be utilized to determine other additives in the PPO-polystyrene process such as, for instance, polyphenylene oxide, polystyrene resins and the various additives by measuring either capacitance or tan δ. Also, the tan δ and capacitance of the mixture can be measured to determine ionic impurities in the mixture.

There is proposed two ways that this may be done. One of the ways this may be done is by uniformly mixing two of the ingredients at a time and then passing them through a capacitance cell to determine the dielectric constant of the mixture. In the case of PPO-polystyrene blends, it will be necessary to pass the two ingredients through an extruder or some other equipment of equal mixing capacity for producing an intimate uniform mixture. By this means, the dielectric constant and the tan δ can be determined of the two, three and other ingredients after they are mixed together all along the line and it is felt reasonably certain that the concentration of the various ingredients can be determined by the method of the instant case utilizing such a mixing procedure as disclosed in Ser. No. 374,585.

There is also hypothesized, within this invention, that the mixture can be mixed as shown in FIG. 2. Then by passing the compounded mixture 160 through a single dielectric cell slit die and sending various frequency signals through the die at different times but in close proximity there can be determined the concentration of the various ingredients in the mixture. That is, utilizing the single die and sending signals of various frequency there can be determined by prior calibration curves made on a single mixture and on a single dielectric cell first the concentration of ingredients and additives in the mixture as well as perhaps even ionic impurities in the mixture.

It is hypothesized that by making calibration curves of a single mixture in a single cell at various frequencies and by knowing the concentration of the ingredients, there can be produced for each ingredient including the ionic impurities, calibration curves.

In accordance with the present process it also should be emphasized that the frequency at which the ionic impurities and the other ingredients are measured by the means of the present invention will vary depending on the ingredients. For the PPO-polystyrene blends, the concentrations of ingredients and particularly the concentration of Kronitex-50 ® is measured at a frequency of 1 kiloHertz and above; for instance, as high as 1 megaHertz. Preferably, the frequency is between 1 kiloHertz to 200 kiloHertz for the determination of triaryl phosphate flame retardant and the other polymer and monomer ingredients.

For the determination of ionic impurities for such PPO-polystyrene blends, it is hypothesized that the frequency would have to be in the area of 10 to 100 Hertz. It must be pointed out that both tan δ and dielectric constant vary with temperature and frequency.

Accordingly, the calibration curves will have to be determined for various frequencies and for various temperatures. That is, by taking different calibration curves at various frequencies and various temperatures of various types of mixtures with various known ionic impurities and various concentration of ingredients there can be produced calibration curves from which a computer or an individual can interpolate to determine the concentration of ingredients at various temperatures, frequencies and temperatures.

As pointed out, FIGS. 3 and 4 are plots of dielectric constant and tan δ for Kronitex-50 ® and PPO-polystyrene blend which values are obtained as disclosed in the examples below. These are calibration curves which show that Kronitex ®-50 varies or increases in a determinable manner in a blend of polyphenylene oxide and polystyrene resin. Not only dielectric constant varies in such a manner but also the tan δ for this blend.

Accordingly, the method of the instant invention could be able to utilize as was the method of copending Ser. No. 374,585 to determine the concentration of ingredients in a compounding process in a matter of fractions of a second irrespective of whether the process is continuous or batch. By the use of a computer, this measuring technique may be utilized to control the process ingredient variables as well as other process variables so as to make the compounded process truly continuous. Although the invention has been reduced to practice only with Kronitex-50 ® in the PPO-polystyrene blend resin line, there is no reason why it should not apply to other polymer compounding processes as well as to polymerization processes as disclosed in copending Golba et al., Ser. No. 374,585.

Further, it is envisioned that such concentration measurements may be made by passing individual mixtures after each ingredient is added through a capacitance cell is disclosed in Ser. No. 374,585 or may be made by passing the entire mixture through a single capacitance cell after it has been blended and by the use of the proper calibration curves, it is postulated that the foregoing principles would apply to determine the concentration of ingredients by the measurement of the dielectric constant and tan δ of the mixture.

It is hypothesized that the latter procedure would also apply to determine the concentrations of ingredients either in a continuous polymerization process or in a compounding process of various thermoplastic polymers styrene resin and small quantities of various additives including a $TiO_2$ pigment.

There was also a Grade B (black) which contained a black pigment. In the Grade B blends for hundred parts of the above blend, there was added 8 parts by weight of Kronitex-50 ®.

In these grades as analyzed by x-ray fluorescent spectroscopy, there was measured in Grade A (black) 5.78% by eight of Kronitex-50 ®; in Grade A (white) there was measured 4.46% by weight of Kronitex-50 ®. In Grade B (black) there was measured 2.53% by weight of Kronitex-50 ® and in Grade B (white), and there was measured 2.53% by weight of Kronitex-50 ® by the foregoing analysis method.

Utilizing these above blended PPO-PS blend there was added the amount of Kronitex-50 ® in pounds per hour to the particular PPO-PS blend disclosed above as is indicated in Table I below. The flow rates and the process conditions as well as the level of Kronitex-50 ®, as determined by x-ray fluorescent spectroscopy on extrudables, are set forth in Table I.

TABLE I

| Flow Rate (lb/hr) | | PROCESS CONDITIONS | | | | | |
|---|---|---|---|---|---|---|---|
| | | Temperature (°C.) | | | | | |
| Resin | Kronitex-50 | Screw Tip | Dielectric Cell | Pressure (PSIG) Screw Tip | Kronitex-50 (%) | Tan δ | Dielectric Constant |
| Grade A (white) | | | | | | | |
| 10 | 0 | 301 | 272 | 410 | 4.46 | 0.533 | 3.45 |
| 10 | 0.13 | 298 | 272 | 408 | 4.82 | 0.620 | 3.75 |
| 10 | 0.26 | 298 | 271 | 370 | 5.91 | 0.774 | 4.42 |
| 10 | 0.52 | 293 | 271 | 305 | 7.35 | 1.042 | 5.86 |
| 10 | 0.77 | — | — | — | — | — | — |
| 10 | 1.04 | 289 | 270 | 220 | 10.36 | 1.784 | 12.38 |
| Grade A (black) | | | | | | | |
| 10 | 0 | 304 | 273 | 528 | 5.78 | 0.437 | 3.10 |
| 10 | 0.13 | 301 | 272 | 490 | 6.02 | 0.523 | 3.37 |
| 10 | 0.26 | 300 | 273 | 440 | 6.87 | 0.590 | 3.57 |
| 10 | 0.52 | 298 | 272 | 398 | 8.31 | 0.757 | 4.25 |
| 10 | 0.77 | 294 | 272 | 355 | 10.24 | 0.983 | 5.40 |
| 10 | 1.04 | 290 | 271 | 295 | 12.89 | 1.23 | 7.02 |
| Grade B (white) | | | | | | | |
| 10 | 0 | 322 | 293 | 582 | 2.53 | 0.304 | 2.82 |
| 10 | 0.13 | 319 | 293 | 573 | 3.73 | 0.363 | 2.94 |
| 10 | 0.26 | 316 | 293 | 545 | 5.06 | 0.432 | 3.11 |
| 10 | 0.52 | 311 | 291 | 565 | 6.15 | 0.597 | 3.62 |
| 10 | 0.77 | 308 | 291 | 532 | 7.11 | 0.820 | 4.54 |
| 10 | 1.04 | 304 | 290 | 472 | 10.12 | 1.056 | 5.84 |
| Grade B (black) | | | | | | | |
| 10 | 0 | 318 | 295 | 785 | 2.53 | 0.504 | 3.23 |
| 10 | 0.13 | 317 | 295 | 780 | 4.58 | 0.600 | 3.54 |
| 10 | 0.26 | 315 | 293 | 762 | 5.54 | 0.695 | 3.89 |
| 10 | 0.52 | 311 | 293 | 750 | 6.87 | 0.910 | 4.87 |
| 10 | 0.77 | 307 | 291 | 738 | 8.79 | 1.178 | 6.44 |
| 10 | 1.04 | 305 | 290 | 729 | 10.00 | 1.505 | 8.94 |

The examples are given below for the purpose of illustrating the present invention. They are not given for purpose of setting limits and boundaries to the instant invention. All parts of the examples are by weight.

In the examples, a broad range of polyphenylene oxide resin blends with rubber modified polystyrene resin were received to reduce to practice the invention. One was Grade A (white) material which contained 40 parts by weight of polyphenylene oxide, 60 parts of polystyrene, and small quantities of various additives including a $TiO_2$ pigment.

Another was Grade A (black) which contained a carbon black pigment. In Grade A blends, per hundred parts of the mixture, there was added 3½ parts by weight of Kronitex.

There was also a Grade B (white) in which there was 55 parts of polyphenylene oxide resin, 45 parts of poly- These results were plotted as shown in FIGS. 3 and 4 and indicate that the concentration of Kronitex-50 ® in weight percent varied in a determinable manner with tan δ and dielectric constants. The amount of error in the measurement is shown by the lines transposing the curve. Concentration can be determined from this calibration curve within the accuracy of ±0.0025 weight fraction of Kronitex-50 ®. This accuracy of measurement is true for Kronitex-50 ® in PPO-polystyrene blend resin only. It will vary with other types of polymers and monomers and other ingredients. For instance in the polymerization process of Ser. No. 374,585, a concentration of ingredients was determined with an accuracy of ±0.001 mole fraction. Nevertheless, this is a high degree of accuracy in the instant process for determining the concentration of Kronitex-50 ® and is well within the desired levels for such measurements in the fabrication and the compounding of PPO-polystyrene blends.

What is claimed is:

1. A method for obtaining a predetermined additive concentration in a polymer mixture comprising (1) mixing at least one polymer and at least one additive to form a mixture; (2) determining the dielectric constant of the mixture and (3) controlling the amount of additive to obtain a dielectric constant in the mixture which is substantially the same as the dielectric constant of the desired mixture.

2. The method of claim 1, wherein the method is continuous.

3. The method of claims 1 or 2, wherein the additive is selected from the class consisting of flame retardants, fillers, pigments and stabilizers.

4. The method of claims 1 or 2, wherein the additive is selected from the class consisting of zinc oxide, zinc sulfate and a triaryl phosphate ester.

5. The method of claim 1 or 2, wherein the dielectric constant of the mixture is determined by means of an automatic capacitance bridge.

6. The method of claim 5, wherein the determination and control are carried out by computer.

7. The method of claim 1 or 2, wherein said polymer is selected from the class consisting of polyphenylene oxide, polystyrene, rubber-modified polystyrene, polycarbonates and polyolefins.

8. The method of claim 1 or 2, further comprising mixing into said mixture any number of other additives one at a time, wherein after each new mixture is formed, the dielectric constant of the new mixture is determined and the amount of additive adjusted so as to obtain the dielectric constant of a mixture containing the desired concentration of said additives.

9. The method of claims 1 or 2, wherein the mixing is carried out in an extruder.

10. The method of claim 5, wherein the capacitance bridge is operated at a frequency of at least 1 kiloHertz.

11. The method of claim 1 or 2 wherein the dissipation factor of the mixture is used to determine concentrations of additives.

12. A method for obtaining a predetermined flame retardant concentration in a polyphenylene oxide-polystyrene blend comprising (1) mixing said blend with flame retardant to form a mixture; (2) determining the dielectric constant of the mixture and (3) controlling the amount of flame retardant to obtain a dielectric constant in the mixture which is substantially the same as the dielectric constant of the mixture with the desired concentration of flame retardant.

13. The method of claim 12 wherein the flame retardant is triaryl phosphate ester.

14. The method of claim 12 wherein the flame retardant is added and mixed in an extruder.

15. The method of claims 1, 2 or 11 wherein concentrations of ionic impurities are determined.

16. The method of claims 1 or 2 wherein the concentration of multiple additives is monitored with a single capacitance cell which is operated sequentially at frequencies which are specific for individual additives.

* * * * *